United States Patent
Nightingale et al.

(10) Patent No.: US 10,860,302 B2
(45) Date of Patent: *Dec. 8, 2020

(54) MEMORY-EFFICIENT UPGRADE STAGING

(71) Applicant: Microsoft Technology Licensing, LLC, Redmond, WA (US)

(72) Inventors: Edmund B. Nightingale, Bellevue, WA (US); Thales Paulo De Carvalho, Issaquah, WA (US); Daryl Roy Zuniga Grosserhode, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/658,824

(22) Filed: Oct. 21, 2019

(65) Prior Publication Data
US 2020/0065082 A1 Feb. 27, 2020

Related U.S. Application Data

(63) Continuation of application No. 16/014,248, filed on Jun. 21, 2018, now Pat. No. 10,452,375.

(51) Int. Cl.
*G06F 9/44* (2018.01)
*G06F 8/61* (2018.01)
(Continued)

(52) U.S. Cl.
CPC ............. *G06F 8/61* (2013.01); *G06F 9/4401* (2013.01); *G06F 21/53* (2013.01); *G06F 21/577* (2013.01);
(Continued)

(58) Field of Classification Search
None
See application file for complete search history.

(56) References Cited

U.S. PATENT DOCUMENTS

| | | | | |
|---|---|---|---|---|
| 5,155,847 A | * | 10/1992 | Kirouac | G06F 8/65 709/221 |
| 6,678,888 B1 | * | 1/2004 | Sakanishi | G06F 8/61 707/999.202 |

(Continued)

FOREIGN PATENT DOCUMENTS

WO 2014078992 A1 5/2014

OTHER PUBLICATIONS

"International Search Report and Written Opinion Issued in PCT Application No. PCT/US2019/037129", dated Oct. 11, 2019, 14 Pages.

*Primary Examiner* — Qamrun Nahar
(74) *Attorney, Agent, or Firm* — Davin Chin; Chin IP, PLLC

(57) ABSTRACT

The disclosed technology is generally directed to embedded device updates. In one example of the technology, staging is performed for at least two priority groups, completing staging of each higher priority group before staging a lower priority group, including, for each priority group, the following actions. A list of install targets is generated for the priority group based on a list of software for installation in a memory and software present in the memory. A list of purge targets is generated for the priority group based on the list of software for installation in the memory and the software present in the memory. The install targets are downloaded to a backup partition of the memory. Updating of the software in the memory is caused based on the install targets. The purge targets are deleted from the memory. The install targets are deleted from the back-up partition.

20 Claims, 6 Drawing Sheets

(51) Int. Cl.
- *G06F 9/4401* (2018.01)
- *G06F 21/53* (2013.01)
- *H04L 29/08* (2006.01)
- *G06F 21/57* (2013.01)
- *H04L 29/06* (2006.01)

(52) U.S. Cl.
CPC .............. *H04L 67/12* (2013.01); *H04L 67/34* (2013.01); *H04L 63/20* (2013.01)

(56) References Cited

U.S. PATENT DOCUMENTS

| | | | |
|---|---|---|---|
| 2007/0261049 A1* | 11/2007 | Bankston | G06F 8/65 717/170 |
| 2016/0196132 A1 | 7/2016 | Searle et al. | |
| 2017/0322790 A1 | 11/2017 | Surdu | |
| 2017/0364345 A1 | 12/2017 | Fontoura et al. | |

* cited by examiner

MEMORY-EFFICIENT UPGRADE STAGING

CROSS-REFERENCE TO RELATED APPLICATION(S)

This application is a continuation of U.S. patent application Ser. No. 16/014,248, filed Jun. 21, 2018, entitled "MEMORY-EFFICIENT UPGRADE STAGING". The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to embedded device updates. In one example of the technology, staging is performed for at least two priority groups, completing staging of each higher priority group before staging a lower priority group, including, for each priority group, the following actions. In some examples, a list of install targets is generated for the priority group based on a list of software for installation in a memory and software present in the memory. In some examples, a list of purge targets is generated for the priority group based on the list of software for installation in the memory and the software present in the memory. In some examples, the install targets are downloaded to a backup partition of the memory. In some examples, updating of the software in the memory is caused based on the install targets. In some examples, the purge targets are deleted from the memory. In some examples, the install targets are deleted from the back-up partition.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
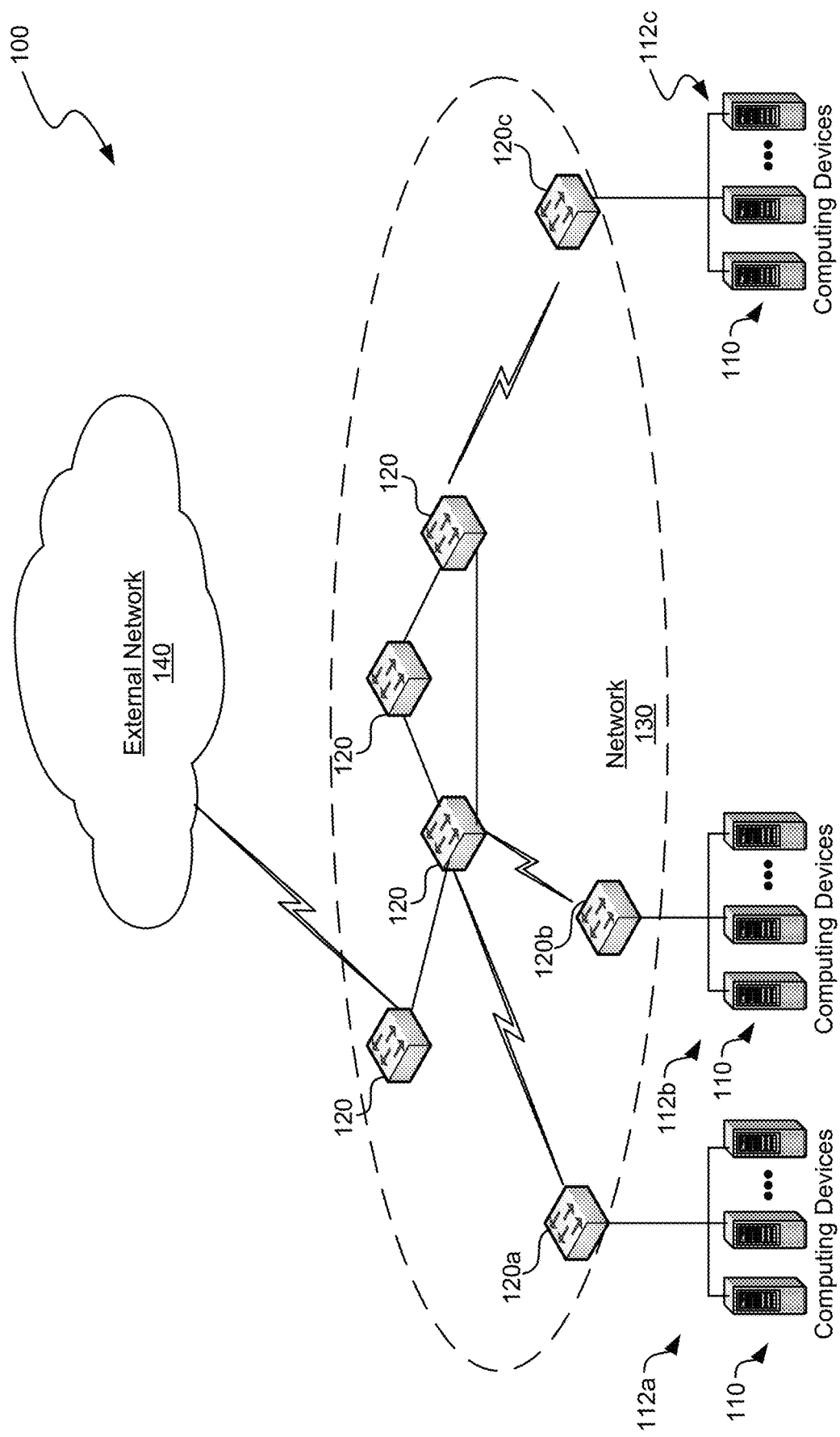
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to embedded device updates. In one example of the technology, staging is performed for at least two priority groups, completing staging of each higher priority group before staging a lower priority group, including, for each priority group, the following actions. In some examples, a list of install targets is generated for the priority group based on a list of software for installation in a memory and software present in the memory. In some examples, a list of purge targets is generated for the priority group based on the list of software for installation in the memory and the software present in the memory. In some examples, the install targets are downloaded to a backup partition of the memory. In some examples, updating of the software in the memory is caused based on the install targets. In some examples, the purge targets are deleted from the memory. In some examples, the install targets are deleted from the back-up partition.

In some examples, before an embedded device upgrade is performed, the upgrade is staged, that is, downloaded and placed where it needs to be in the proper partition but prior to actual installation of the update. The staging can be challenging to manage where there is insufficient space to store the entire update, and where there are complex issues of prioritization.

A list may be received or generated in some manner that indicates the software that should be present once the update is complete. This list may be used during the staging as discussed in greater detail below.

In some examples, the staging is prioritized in multiple ways. As one type of prioritization, in some examples, the staging be organized into priority groups that are ordered by priority, so that the priority group with the highest priority is staged first in its entirety before proceeding to the next priority group, the next highest priority group is then staged in its entirety before proceeding to the next priority group, and so on, until each of the priority groups is staged.

Each priority group may be staged as follows. The list that indicates the software that should be present once the update is complete is compared with the software currently present in the persistent memory, for the priority group that is being staged. A list of install targets is generated based on the comparison, where the list includes software that not currently present in memory, and versions of software that need to be updated relative to the software currently in memory, in the priority group being staged. Then, a list of purge targets may be generated based on the comparison, where the purge targets include software currently present in memory but not present in the list of software that should be present once the updated is completed, for the current priority group.

The software corresponding to the install targets may then be downloaded. In some examples, the software for the current priority group is then caused to be updated based on the install targets. Also, the purge targets may be deleted. Once the installation is complete, in some examples, the install targets are deleted from memory, because there may not be sufficient memory for the entire update to be staged on once.

The staging may be altered and may include additional steps in various examples, for example to include a rollback to the last known good state, to allow for test applications, and/or for other reasons, as discussed in greater detail below.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT support service, a device comprising part or all of an application back-end, or the like, as discussed in greater detail below.

Illustrative Computing Device

Figure 2:
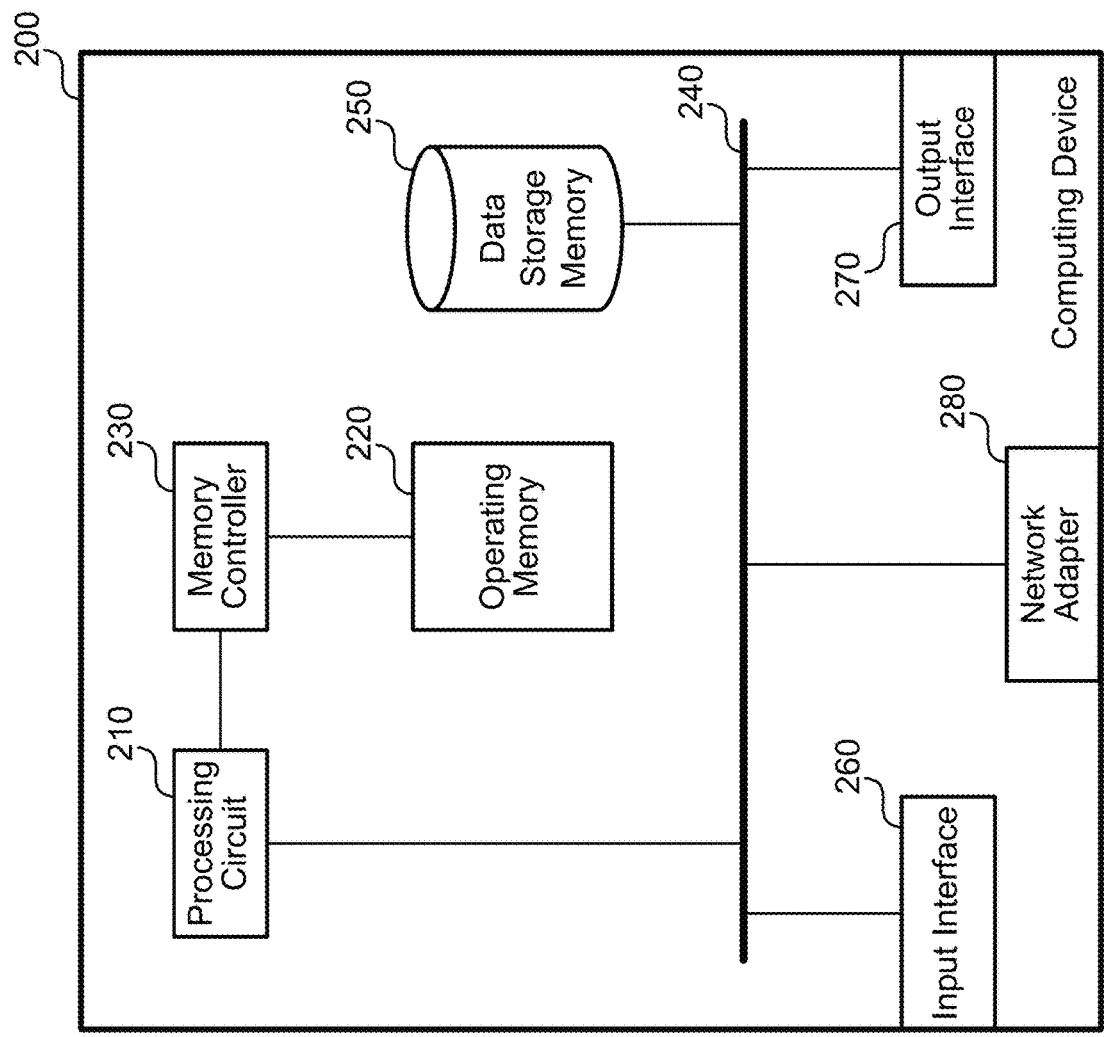
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage. In some examples, performance counter 475 may also be configured to measure latency from a core to a target, such as from MCU 462 to SRAM 458.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Some examples of the disclosure are used in the context of a multi-core microcontroller included in an IoT device that operates as a device controller for an IoT device. Examples of the disclosure may also be used in other suitable contexts. A particular example of the disclosure used in the context of a multi-core microcontroller included in an IoT device that operates as a device controller for an IoT device is discussed below with regard to FIG. 4 and FIG. 5.

Figure 3:
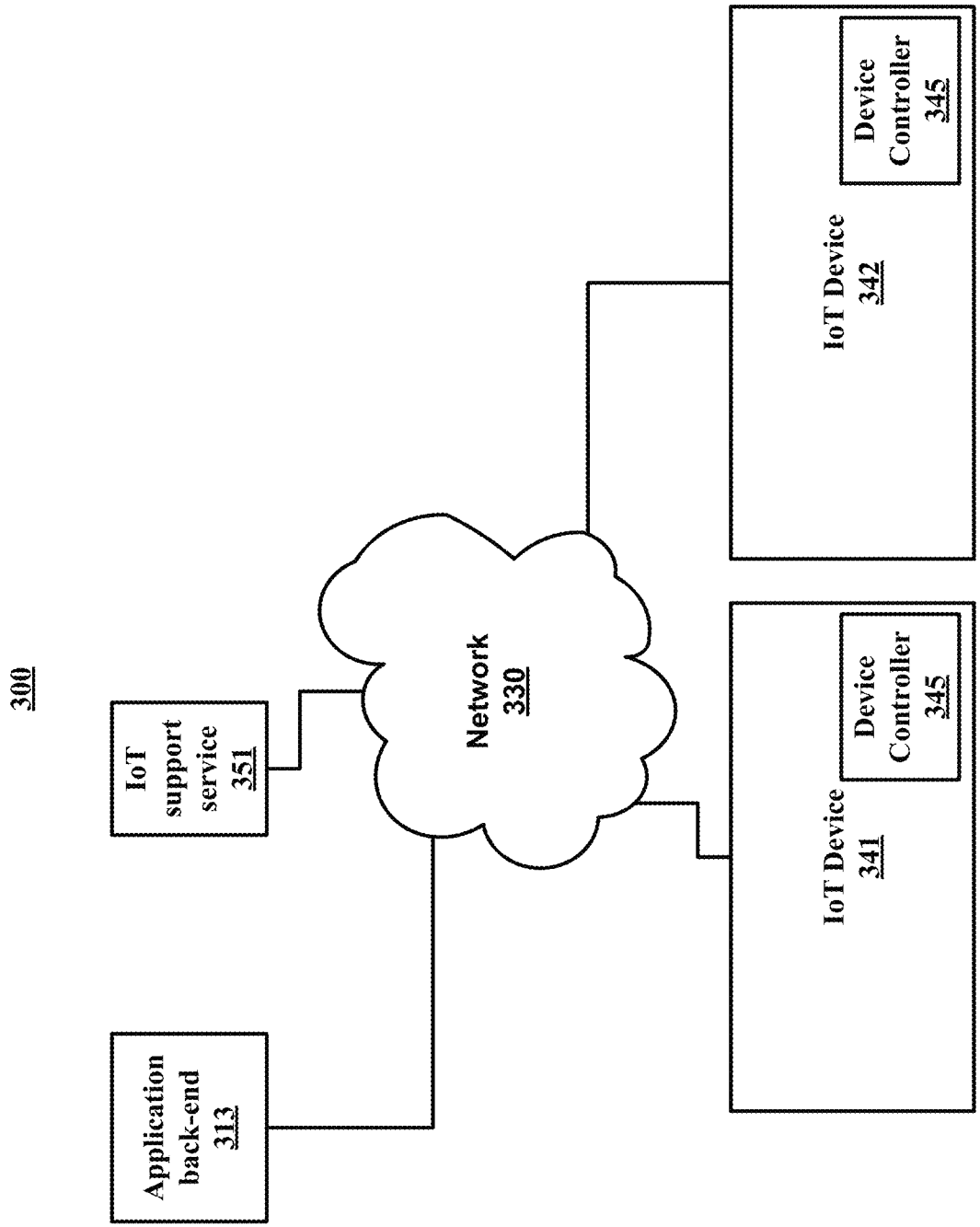
FIG. 3 is a block diagram illustrating an example of a system.

FIG. 3 is a block diagram illustrating an example of a system (300). System 300 may include network 330, as well as IoT support service 351, IoT devices 341 and 342, and application back-end 313, which all connect to network 330.

The term "IoT device" refers to a device intended to make use of IoT services. An IoT device can include virtually any device that connects to a network to use IoT services, including for telemetry collection or any other purpose. IoT devices include any devices that can connect to a network to make use of IoT services. In various examples, IoT devices may communicate with a cloud, with peers or local system or a combination or peers and local systems and the cloud, or in any other suitable manner. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, and numerous other applications.

The term "IoT support service" refers to a device, a portion of at least one device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service. In some examples, an IoT support service may be embedded inside of a device, or in local infrastructure.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. Application back-end 313 could also be one or more virtual machines deployed in a public or a private cloud. In some examples, at least some of the actions taken by the application back-end may be performed by applications running in application back-end 313.

Each of the IoT devices 341 and 342 and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. FIG. 3 and the corresponding description of FIG. 3 in the specification illustrates an example system for illustrative purposes that does not limit the scope of the disclosure.

One or more of the IoT devices 341 and 342 may include device controller 345, which may operate to control the IoT device. Each device controller 345 may include multiple execution environments. Device controller 345 may be a multi-core microcontroller. In some examples, device controller 345 is an integrated circuit with multiple cores, such as at least one central processing unit (CPU) and at least one microcontroller (MCU).

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by IoT support service 351.

Device updates for IoT devices such as IoT devices 341 and 342 may occur at various times. For example, applications, other software, and/or firmware on an IoT device may be updated. Updates may be communicated to the IoT devices (e.g., 341 and 342) from the IoT support service (e.g., IoT support service 351 or application back-end 313 or the like) via network 330. The IoT devices may be configured perform updates, and to perform staging for the updates in a memory-efficient manner that includes particular prioritizations.

System 300 may include more or less devices than illustrated in FIG. 3, which is shown by way of example only.

Illustrative Device

Figure 4:
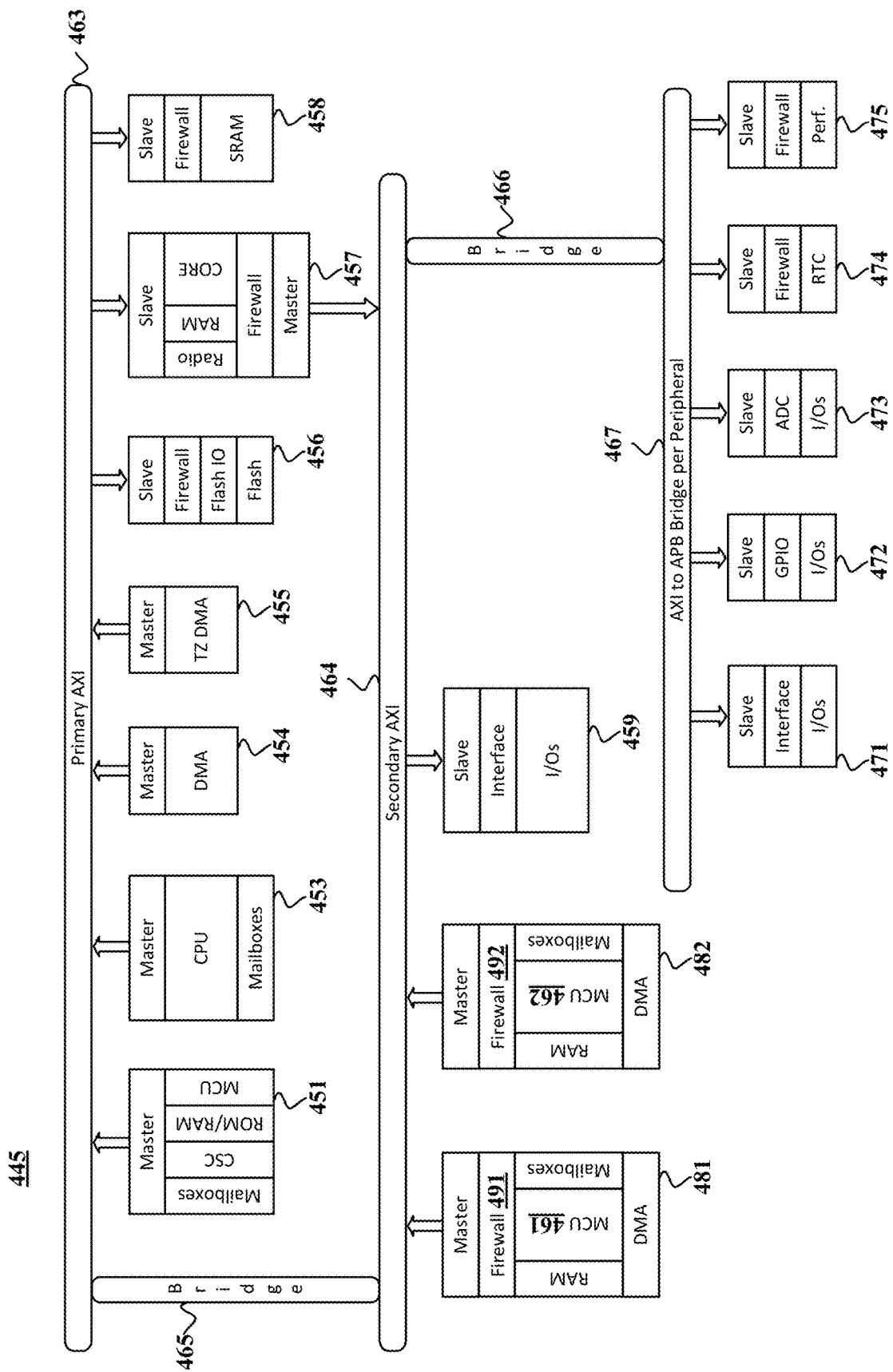
FIG. 4 is a block diagram illustrating an example of the device controller of FIG. 3.

FIG. 4 is a block diagram illustrating an example of device controller 445. Device controller 445 may be employed as an example of device controller 345 of FIG. 3. Device controller 445 may include security complex 451, CPU 453, direct memory access (DMA) block 454, trust zone (TZ) DMA block 455, Flash memory 456, Radio block 457, secure static random access memory (SRAM) 458, Interfaces 459, MCU 461, MCU 462, primary advanced extensible interface (AXI) bus 463, secondary AXI bus 464, bridges 465 and 466, AXI to advanced peripheral bus (APB) bridges per peripheral 467, Interfaces 471, GPIOs 472, analog-to-digital converter (ADC) 473, real-time clock (RTC) 474, and performance counter 475.

In some examples, device controller 445 enables a device in which device controller 445 is included to operate as an IoT device, such as IoT device 341 or 342 of FIG. 3. In some examples, device controller 445 is a multi-core microcontroller. In some examples, device controller 445 runs a high-level operating system. In some examples, device controller 445 may have at least 4 MB of RAM and at least 4 MB of flash memory, and may be a single integrated circuit. In some examples, device controller 445 provides not just network connectivity, but various other functions including hardware and software security, a monitored operating system, cryptographic functions, peripheral control, telemetry, and/or the like. In addition, device controller 445 may include technology for allowing device controller 445 to be booted in a secure manner, allowing device controller 445 to be securely updated, ensuring that proper software is running on device controller 445, allowing device controller 445 to function correctly as an IoT device, and/or the like.

In some examples, security complex 451 include a core security complex (CSC) that is the hardware root of trust in device controller 445. In some examples, the core security complex is directly connected to the secure MCU in security complex 451. In some examples, the secure MCU in security complex 451 has a very high degree of trust, but is less trusted than the core security complex in security complex 451. In some examples, security complex 451 brings up the full system at boot.

In some examples, CPU 453 runs a high-level operating system. In some examples, CPU 453 has two independent execution environments: a Secure World execution environment and a Normal World execution environment. The term "secure world" is used broadly to refer to a trusted environment and is not limited to a particular security feature. In some examples, the Secure World execution environment of CPU 453 is also part of the trusted computing base of the system. For instance, in some examples, the Secure World execution environment of CPU 453 has unfettered access to reprogram hardware protection mechanisms, such as firewalls in some examples. In some examples, the Secure World execution environment of CPU 453 does not, however, have access to the internals of the core security complex of security complex 451 and relies on the secure MCU of security complex 451 for particular security-sensitive operations.

Radio block 457 may provide Wi-Fi communication. Primary AXI bus 463 and secondary AXI bus 464 may be buses that connect the components shown. In some examples, bridges 465, 466, and 467 bridge the components shown. RTC block 474 may operate as a real-time clock. In some examples, all components in device controller 345 can read from the RTC block 474, but not all components have write access to RTC block 474. Device controller 445 may include various forms of memory, including flash and SRAM, such as flash memory 456 and secure SRAM 458.

In some examples, IO Subsystem 1 461 and IO Subsystem 2 462 are I/O subsystems for general purpose I/O connectivity. In some examples, IO Subsystem 1 461 and IO Subsystem 2 462 each include an MCU.

DMA block 454 may be used to manage data movement for the Normal World execution environment of CPU 453. Trust zone (TZ) DMA block 455 may be used to manage data movement for the Secure World execution environment of CPU 453. In some examples, each IO subsystem also has its own DMA block. Each of the DMA blocks may be configured to support data movement between cores, peripherals, other components, and/or the like.

Each of the cores may have bi-directional mailboxes to support inter-processor communication. Performance counter 475 may be configured to count read requests, write requests, and data type requests for performance monitoring. In some examples, performance counter 475 may also be configured to measure latency from a core to a target, such as from MCU 462 to SRAM 458.

In some examples, the interfaces at block 459 include two Inter-integrated circuit Sound (I2S) interfaces: one for audio input and one for audio output. In other examples, other configurations of interfaces may be employed, and block 459 may include any suitable interfaces in various examples.

In some examples, the MCU in security complex 451 has a very high degree of trust, but is less trusted than the core security complex in security complex 451. In these examples, the MCU in security complex 451 controls one or more functions associated with a very high degree of trust. In one example, the MCU in security complex 451 controls power for device controller 445 and/or an IoT device.

In some examples, the Secure World execution environment of CPU 453 is also part of the trusted computing base of the system. For instance, in some examples, the Secure World runtime of CPU 453 (Secure World RT) has unfettered access to reprogram hardware protection mechanisms, such as firewalls in some examples. In some examples, Secure World RT does not, however, have access to the internals of the core security complex of security complex 451 and relies on the MCU in security complex 451 for particular security-sensitive operations.

The Normal World execution environment of CPU 453 may be configured to have limited access to such on-chip resources such as memories. In some examples, various security and quality standards (e.g., relatively high standards) may be enforced for code running in this environment but is less trusted than either the code running on the MCU in security complex 451 or the code running in the Secure World of CPU 453.

In some examples, MCUs 461 and 462 are less trusted than the MCU in security complex 451 and less trusted than CPU 453. In some examples, Radio block 457 may include a core, which may be an MCU in some examples. Radio block 457 may provide Wi-Fi functionality and connectivity to the Internet and cloud services such as IoT services. In some examples, Radio block 457 may provide communications via Bluetooth, Near Field Communication (NFC), ZigBee, Long-Term Evolution (LTE), and/or other connectivity technology. In some examples, the core in Radio block 457 does not have any access to unencrypted secrets, and is not capable of compromising the execution of CPU 453.

In some examples, each independent execution environment is managed by a single software component executing in a separate execution environment that is referred to the "parent" of the execution environment. In such examples, one exception may be that the hardware root of trust (the core security complex of security complex 451 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, the Normal World of CPU 453 is the environment that manages MCUs 461 and 462, but receives assistance from the Secure World of CPU 453 to do so.

For instance, in some examples, the MCU of security complex 451 manages Secure World RT of CPU 453, a component in Secure World RT in CPU 453 manages Normal World OS of CPU 453, a component in the Normal World OS of CPU 453 manages Normal World user-mode of CPU 453, and Normal World user-mode services of CPU 453 manages the MCUs 461 and 462 and the core in Radio block 457.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, in some examples, the independent execution environments achieve defense-in-depth based on a hierarchy of trust.

For instance, in some examples, the core security complex of security complex 451 is at the top of the hierarchy and is assigned to secrets (e.g., encryption keys), the secure MCU in core security complex 451 is next in the hierarchy and is assigned to controlling power, Secure World RT of CPU 453 is next in the hierarchy and is assigned to storage and to write access to a real time clock (RTC), Normal World OS of CPU 453 is next in the hierarchy and is assigned to Wi-Fi, Normal World user-mode applications of CPU 453 is next in the hierarchy and is assigned to applications, and the MCUs 461 and 462 are at the bottom of the hierarchy and are assigned to peripherals. In other examples, functions are assigned to independent execution environments in a different manner.

In some examples, each level of the hierarchy of trust, except for the bottom (i.e., least trusted) level of the hierarchy, has control over accepting or rejecting requests from a less trusted level, e.g., in terms of implementing support for the software they handle, and have the ability to rate limit or audit the requests from less trusted levels, and to validate requests from lower levels, e.g., to ensure that the requests correct and true. Also, as previously discussed, in some examples, each level of hierarchy except the top (i.e., most trusted) level has a parent that is responsible for managing the lower (i.e., less trusted) level, including monitoring whether the software on the lower level is running correctly.

Some examples of device controller 455 may be a multi-core microprocessor that includes, for example, at least one CPU and at least one microcontroller, in addition to flash memory with multiple banks as previously discussed. In some examples, the multi-core processor may be an integrated circuit with multiple cores. In some examples, the multi-core processor may be used to provide functionality for a connected device. In some examples, device controller 455 may provide network connectivity to the connected device, and may also provide various other functions such as hardware and software security, a monitored operating system, cryptographic functions, peripheral control, telemetry, and/or the like. In addition, device controller 455 may include technology for allowing device controller 455 to be booted in a secure manner, allowing the device to be securely updated, ensuring that "proper" software is running on the device, allowing the device to function correctly as an IoT device, and/or the like. Security complex 451 may include the hardware root of trust of device controller 455 as the basis for the security functions provided by device controller 455.

In some examples, flash memory 456 is an external NOR flash memory that includes a flash controller and dual quad serial public interface (QSPI) NOR flash devices (the two memory banks, in this example) in parallel, where each flash memory bank is a separate integrated circuit accessed via a separate channel. However, the disclosure is not so limited, and any suitable memory configuration and/or suitable set of memories may be employed.

During a normal boot, the processor may be booted in a secure manner that begins with a security complex that includes a hardware root of trust for device controller 455. In some examples, a first bootloader is read from ROM, and a public key may be used by security complex 451 to verify that the first bootloader has been properly digitally signed. In some examples, verifying the signature of the first bootloader is a cryptographic operation that is performed in hardware. In some examples, until and unless the digital signature of the first bootloader is verified, the first bootloader is not loaded, and access to all of the flash memory banks is prevented. In some examples, once the signature of the first bootloader is verified, the first bootloader is loaded, and access to all of the flash memory banks is allowed. In some examples, further verification beyond just verification of the first bootloader has been signed may also be required in order to grant access to all of the flash memory banks. This may be used to help protect against, for example, loading of valid older code with vulnerabilities.

In some examples, verification in order to allow access to allow the memory banks may proceeds as follows. Security complex 451 may read in a portion of one of the memory banks that is not restricted, such as the first memory bank in some examples. In some examples, this portion of the flash memory may be 16 kb, 52 kb, or the like. A hardware block in security complex 451 may then compare the loaded portion of the non-restricted flash memory bank against particular hardware fuses, with verification being unsuccessful unless the loaded portion matches the fuses. Hardware keys may also be used to verify that the code is trusted code in some examples. Comparison of a portion of the non-restricted portion of the flash memory against hardware fuses by a hardware block in security complex 451 may be used to prevent previously valid but now older code from having vulnerabilities being loaded. Fuses may be burned, along with changing the corresponding non-restricted portion of flash memory to be checked against the hardware fuses to be matched with the fuses being updated, to prevent such older code from subsequently being validated and from having access to the secrets stored in the secure portion of the flash memory.

In some examples, flash memory 456 is a single-image memory. In some examples, flash memory 456 has one bank. In some examples, flash memory 456 has two banks, and/or other separation(s) in the memory but is still a single-image memory in which the separations are not accessible.

In some examples, flash memory 456 is protected from corruption with an example of an erasure coding scheme as described here. Although the erasure coding scheme is described herein with regard to flash memory 456, the erasure coding schema may also be used with any suitable memory or set of data. In some examples, the erasure coding scheme described herein may be particular beneficial with regard to embedded devices with a single-image memory for which is desirable to protect against a significant amount of contiguous corruption, accidental overwrite, and/or the like, and where there is not significant space to store full back-ups. In some examples, the erasure coding scheme is used with flash memory to protect against flash memory corruption.

In some examples, individual applications and/or pieces of firmware may be dynamically erasure coded, using a different erasure coding scheme for each different application and/or piece of software, with flexibility based on the size of each application and/or piece of firmware being encoded.

In some examples, an erasure coding scheme may be used in which the memory is erasure coded based on consecutive stripes of a fixed size, with possibly a partial stripe left over if the memory size is not evenly divisible by the stripe size.

In some examples, an erasure coding scheme may be used in which the memory is erasure coded based on non-consecutive stripes of a fixed size, with possibly a partial stripe left over if the memory size is not evenly divisible by the stripe size. For instance, in some examples, the erasure coding scheme may use stripes in a "checkerboard" pattern in which each data block is divided by the number of stripes, e.g., striping the data blocks within a stripe among all other stripes.

In this way, in some examples, with N stripes, the first data block of size S is divided into N stripes, with the first S/N of data belonging to the first stripe, the next S/N of data belonging to the second stripe, and so on, with the first S/N of the second data block being the next S/N of data of the first stripe, and so on. In another example, for a first data block of size S is divided into N stripes, the first S/N of data may belong to the first block, and the second blocks data is cording to stripe size*block size*stripe number.

For instance, in one example, with a 16 MB memory with 8 MB of memory dedicated to applications, the 8 MB of applications can be erasure coded with 64 kb stripes, using 8 k data blocks. Accordingly, in this example, there is 8 MB/64 kb stripes, which is 133 stripes. Accordingly, in this example, the first stripe begins with the first 8 MB/(8 kb*133) of data, the second stripe begins with the second 8 MB/(8 kb*133) of data, and so on. In this example, after the first block of each of the 133 stripes, the first stripe then continues with the next 8 MB/(8 kb*133) of data, and so on. In some examples, the offsets of each stripe are calculated and the stripes are stitched together based on the calculated offsets, and the stripes are then input to the erasure coding algorithm. In this way, in this example, the memory can recover from up to one continuous MB of corruption. However, the amount of corruption that can be recovered from depends on the number of erasure coding blocks generated (e.g., the chosen fault tolerance model). Also, in some examples, while tuned for preventing corruption of contiguous portions of memory, this does not prevent tolerating random corruption. For example, some instance of random corruption can be prevented via the disclosed technology.

In some examples, a hash or checksum of every single data block that is erasure coded is stored. In some examples, the checksums or hashes are not stored in the data itself, but instead there is a separate block hash partition, file, or other data structure that tracks hashes.

A fault tolerance may be selected, with greater fault tolerances requiring a greater overhead. For instance, in some examples, the erasure coding algorithm tolerates two bad blocks per stripe instead of one, with greater overhead required than if the algorithm tolerated one bad block per stripe. In some examples, there is a trade-off between fault tolerance and overhead.

If there is a partial stripe, e.g., a stripe with less than a full stripes worth of data, the partial stripe can be handled in different manners in different examples. In some examples, phantom blocks may be used, in which the leftover blocks are zeros that are not actually stored. This scheme may be less fault tolerant, e.g., because the partial stripe may only be able to tolerate contiguous corruption in an amount associated with the chosen the fault tolerance mechanism chosen. Alternatively, a full back-up may be kept of the partial stripe for greater fault tolerance.

In some examples, in the erasure code generation, the inputs are the amount of memory that is being erasure coded, the erasure coding scheme to be used, the stripe size, the block size, how to handle any partial stripes, and the fault tolerance (i.e., how many bad blocks per stripe can be recovered from).

In some examples, after receiving the inputs, for all data for which there is no partial stripes, the number of stripes are counted, and each stripe is generated as discussed above, based on calculated offsets to generate each stripe and providing the stripes to the erasure coding algorithm. If the memory is byte-addressable NOR flash, the addresses may be read based on the calculated offsets directly using pointers.

In some examples, the hashes are also calculated. In some examples, the hashes are calculated from another mechanism and the hashes calculated and stored from another mechanism can be re-used by the erasure coding.

The erasure coding generation process is discussed above. If corruption occurs, the corrupted data may be repaired using the generated erasure code based on an erasure coding repair process. The repair process may be initiated based on corruption being detected in the memory, which may occur in various ways in various examples. In some examples, corruption is detected in some way for a file or executable binary, such as via hash or signature verification, which may cause the repair process to be initiated.

In some examples, in the repair process, first the bad blocks are determined by checking the blocks against the hashes. In some examples, along the flash range that is known to be corrupt, for each block in the flash range, the stripe that the block is in is calculated, all of the addresses in the stripe are found, and the hash of those blocks is checked against the known hashes for those blocks. In some examples, for each hash that is mismatched, the corresponding block is declared to be bad for that stripe.

Next, in some examples, the number of bad blocks is compared with the fault tolerance. If there are zero bad blocks, then in some examples, the process continues to the next stripe. In some examples, if there are one or more bad blocks, and the number of bad blocks is greater than the fault tolerance, then the stripe cannot be repaired. In some examples, if there are one or more bad blocks, and the number of bad blocks is less than or equal to the fault tolerance, then the bad blocks are repaired, e.g., by invoking a chosen erasure coding scheme with the stripe data and the erasure coding blocks.

In some examples, to repair a bad block, the stripe filled out is passed through the erasure coding algorithm along with an indication as to which block is bad, and the pointer to the erasure coding block for that stripe is also passed to the algorithm. In some examples, the algorithm then returns a repaired block. In some examples, the hash to the repair block is re-calculated, and a determination is made as to whether the hash matches the stored hash for the block. In some examples, if there is a mismatch, then either the repair failed, or the stored block hash is bad.

In some examples, every block in the range is either repaired, or skipped because it is not corrupt, in this manner. Once this is complete, in some examples, a confirmation may be made as to whether the range is still corrupt. For instance, in an example in which the range was found corrupt based on a mismatched signature, the range can be sent to the entity that initially performed the signature check, and that entity can check to determine whether the range is still corrupted, for example, by re-running the signature check and conforming that the verification now passes.

The erasure code may also be updated when the data content of the memory that is protected by the erasure coding is changed. First, in some examples, a range of memory that is changed is input. In some examples, for each block, the erasure coding data is regenerated using the same process described above for erasure code generation. In some examples, each generated erasure coding block is overwritten with the new block.

In other examples, each block in the range is compared with the stored block hashes. In these examples, only those blocks for which the hashes different have their erasure coding data regenerated, with those blocks being overwritten. In some examples, blocks for which the hash matches are skipped, e.g., if the data for the block within the stripe has not changed, then the stripe's erasure coding block is not updated.

Device updates for device controller 455 may occur frequently. For example, applications, other software, and/or firmware on device controller 455 may be updated. An update may be composed of a set of binaries that are referred to as images or image binaries. In some examples, each image binary has an associated piece of metadata called an image metadata. In some examples, the image metadata may include the name of the image, version of the image, signature, and/or the like. In some examples, the image metadata is stored in the cloud, e.g., making it queryable.

In some examples, the image metadata is also embedded into the image binary itself, e.g., ensuring that any image binary is self-describing. This might be implemented by uploading the metadata as a separate file, with the service repackaging the image binary and metadata together. Alternatively, the metadata might be pre-packed inside of the image binary, and unpackaged by the service.

A hardware stock keeping unit (SKU) is used in some examples as part of the process of describing hardware update policy and allowing its efficient implementation. In some examples, hardware SKUs are not a unique identifier of a single chip or device. Rather, in these examples, the hardware SKU uniquely identifies a particular configuration (color, model, capabilities, country etc.) in which a device is sold. In one example, the hardware SKUs for each IoT device include a device SKU and a chip SKU. In some examples, there may be more than two descriptive SKUs such that three or more types of SKUs provide a hierarchy of three or more levels. The chip SKU may define the particular type of chip that is running within the IoT device and the capabilities of the chip. A serial number, public key, or device ID may be used to uniquely identify a single instance of a chip.

The device SKU may be used as an identifier that describes a type of IoT device that uses a chip. The SKU might be the SKU used by a product manufacturer that identifies a particular model and configuration in its product line. Each device SKU may have a set of attributes that describe features that are software dependent. In addition, every device SKU may have an attribute describing a unique chip SKU that all devices with this device SKU contain. These attributes may also be defined and stored in the IoT service solution within the SKU registries. The attributes may also describe features that the manufacturer uses to differentiate models of IoT devices from one another (i.e., washer vs dryer, tan vs. stainless steel), but also small differences (the hardware SKU for the motor used, the type of LED panel connected to the 4×4 chip) that compose the IoT device. In some examples, there are two SKU registries; one registry for device SKUs and another registry for chip SKUs.

A release describes binary content that can be made available to a device. A release is a coherent set of image binaries for some targets. In some examples, a release is composed of at least four different entities: a set of image binaries, a single SKU, a component ID, and a semantic version. In some examples, each IoT device has at least two different releases installed on it. In some examples, a component ID collects all images that apply to a single component. A release may be coherent in that a release is pre-tested to ensure that all of the binaries in the release work together.

In some examples, releases are not made available to IoT devices until they are deployed. In some examples, deployments bundle a set of releases with a set of constraints defining the properties of devices the deployment is intended for. In some examples, after a deployment is registered and activated, it is included in queries when ultimately calculating which releases are intended for an IoT device.

In some examples, to begin the update process, a software engineer registers and uploads new image binaries from a local machine to an IoT update service associated with the IoT support service for the IoT devices. In some examples, the uploaded image binaries should be signed, because the image binaries will only be validated if the image binaries are signed. In some examples, image signing allows each image binary to be authenticated as being signed by a trusted entity.

In some examples, the software engineer may also define new releases around a particular SKU and register them with the IoT update service. The engineer may also be able to increment the release version number, compose a set of image binaries for the next version of a release, confirm that the composed image binaries meet all of the constraints provided by each image's metadata, and receive suggestions for constraint-compatible image binaries. For any given release, the software engineer may be able to use query tools to see the set of IoT devices for which the release is currently used, used as a backup, or made available. Further, the engineer may be able to query a particular device group and determine which set of deployments and releases the group is currently using.

Once a new release is defined, an engineer may target that release at a set of machines by defining a deployment. An engineer may target a single SKU (across releases), or target all SKUs that are dependent on an image binary that was recently updated. After a deployment is activated it may be made available to IoT devices when the IoT devices next check for updates. In the normal case an IoT device may make a request for services to send it which releases it should currently have on some regular cadence (e.g., weekly). The engineer may also proactively request devices immediately make this request rather than on the regular cadence.

In some examples, the cloud services are capable of initiating both upgrades and downgrades in the release. In some examples, the cloud can force IoT devices to rollback to an old release. As discussed in greater detail below, in some examples, the IoT devices include backup copies of previous updates. In some examples, the cloud can force an IoT device to downgrade to a previous update release that is stored as a backup copy on the IoT device. In some examples, there is insufficient space to store an uncompressed backup copy, and the backup copy of the last known good version is stored in a compressed state.

In some examples, when a release is made available to a group of IoT devices via a deployment, it will not be made available to all IoT devices in the group simultaneously. Instead, in these examples, each release is made available in a rolling deployment. For example, a rolling deployment may start by deploying to a small subset of targeted IoT devices. As updates complete successfully, the number of IoT devices eligible for deployment increases.

In some examples, one or more of the IoT devices each include a daemon that sends a query to a cloud service (e.g., IoT support service) as to whether or not there is a currently available new device update for the IoT device. In some examples, the daemon is included on the NW of the IoT device. Next, the NW daemon on the IoT device may receive, from the cloud service, information related to an update for the IoT device. In some examples, the information includes an indication of the release that the IoT device should be on, and includes metadata associated with the indicated release, such as the semantic version, and metadata associated with each image binary in the indicated release such as an ID, a version, and the like. In some examples, secure transmission is used in the communication between the IoT device and the cloud service.

In some cases, upon receiving the indication related to the update for the IoT device, the IoT device validates the update. In some examples, the IoT device validates the update by validating that the update is properly signed. In some examples, the IoT device also confirms whether a new version should be downloaded by comparing the image binaries to be installed for the update against what is already installed in the IoT device. In some examples, the IoT device then determines which image binaries should be downloaded from the cloud service to ultimately be installed as part of the update process. In some examples, for each image binary that the IoT device determined should be downloaded from the cloud service, the daemon sends a corresponding request to the cloud service to download the image binary.

In some examples, the cloud service sends to the daemon the location of each download in response to a request for the location of each image binary, and then the daemon sends requests to the indicated locations to download each image binary.

In some examples, the IoT device then receives the requested image binaries from the cloud service. In some examples, there is insufficient RAM on the IoT device to store the image binaries in memory, and so instead each image binary is streamed to the IoT device. The total set of image binaries received by the IoT device comprise a release. In some examples, secure transmission is used between the cloud service and the IoT device. Further, in some examples, a compressed version of the update is downloaded, because there is insufficient space to store an uncompressed version.

In some examples, before the update is performed, the update is staged. Staging may refer to downloading and placing the update where it needs to be in the proper partition but prior to actual installation of the update. The staging can be challenging to manage where there is insufficient space to store the entire update, and where there are complex issues of prioritization. In some examples, the staging is performed in a particular manner and with multiple levels of prioritization. The staging is discussed in greater detail below.

In some examples, as part of the update process, a list may be received or generated in some manner that indicates the software that should be present once the update is complete. The list may be used during the staging and updating processes. In some examples, the list is a manifest that the IoT device receives from the cloud service, where the manifest is a list provided to the IoT device from the cloud service, the manifest is signed, and the manifest is a list of the software that should be present once the update is complete, where the software is identified via identifiers, such as image IDs. In other examples, the list is received or generated in some other manner.

Device controller 445 and the corresponding flash memory may be divided into a number of partitions. In some examples, the partitions are physical partitions, and in other examples, the partitions are logical partitions. In the example of device controller 455 illustrated in FIG. 4, the partitions are physical partitions including a firmware partition, an OS partition, and an applications partition. Other suitable partitions may be employed in other examples.

In some examples, the partitions are updated atomically. In some examples, updating a partition "atomically" means updating the partition as a single unit, rather than completing an update to one portion of the partition at one time and another part of the partition at another time. In some examples, particularly where there are inter-partition dependencies, the partitions may be atomically updated in a specific order, to ensure that a newly updated partition does not rely upon a dependency on updated functionality on another partition that has yet to be updated. In some examples, the upgrade is complete after each partition has been atomically upgraded, with the atomic partition upgrades proceeding in the proper order in cases in which an order is required based on the inter-partition dependencies.

In some examples, partition tables are used to ensure that a partition upgrade is tolerant to power faults and/or other failures. In some examples, there are two partition tables in each partition, a primary partition table and a back-up partition table. In some examples, there are two tables because, if a power and/or other failure occurs while one of the partition tables is being written to, the other partition table is still valid. In some examples, each partition table has an entry for each image on the partition, and each entry includes information about the image, such as, in some examples, the offset of the image in flash memory. The information may also include the status of the image, including whether or not the image has been installed. In some examples, the table uses some mechanism, such as a hash, to determine whether the table is consistent or corrupted.

In some examples, atomically updating a partition may be accomplished as follows.

After the installation has been staged for the partition, the updated version is written to the partition. Next, the updated version is verified. After the updated version is verified, the current partition table is copied to memory. The original entry pointing to the original version is deleted, and then a new entry pointed to the current version is added to the copy. At this point, the copy is now the updated partition table. The updated partition table is then written to the back-up partition table. Then at the next boot, the updated partition table is written to the primary partition table.

Next, a boot health check is performed. If the boot health check succeeds, then the update to the partition is complete. If the boot health check fails, the following actions are taken. If the primary partition table is corrupt, then the primary partition table is overwritten with the backup partition table. If the backup partition table is corrupt, then the backup partition table is overwritten with the primary partition table. If neither the primary partition table nor the secondary partition table is corrupt, but the primary partition table and secondary partition table different from each other, this indicates that there was a power fault and/or other failure between the writing of the primary partition table and the secondary partition table, and so the primary partition table is then overwritten with the back-up partition table. If the primary partition table and the backup partition table are both corrupt, then either the partition tables are corrected through as other method, such as erasure coding, as discussed in greater detail below, or the upgrade fails.

The method above describes an example of an image update when sufficient free space exists for the updated version. If sufficient free space for the updated version does not exist, the following steps may first be performed.

First, a memory allocator is used to determine the offset of each image in flash in the partition. Next, in memory, a virtual layout is created. The virtual layout is used to determine whether there is sufficient total room in the flash memory, but the free space is fragmented. In some examples, if there is not sufficient room in the flash memory, even taking into account the fragmented space—in this case, the update fails.

If, however there is sufficient space when taking into account the fragmented space, then images not being updated may be copied to the backup partition. Next an empty table may be written to flash to both the primary partition table and the backup partition table. If a power and/or other failure occurs after writing the empty tables, installation can simply pick up where it left off after the first time.

Next, the images not being updated may be copied back into flash memory along with the new images to be updated, packing the images tightly. The steps may then proceed as they normally would.

Although the memory allocator is discussed above to be used in when there is insufficient free space, in some examples, the memory allocator tracks the free space available in each case.

The above discussion describes a method of updating that is tolerant to power, and other, failures. In some examples, the partition tables may also be protected from corruption with erasure coding. A hash may be taken of each partition table, and the hash may be used to detect corruption to a partition table. In some examples, in order to upgrade a partition in a way that is protected from both failures and corruption, the erasure coding blocks are also be updated, and in the correct order.

One example of an update method that is also tolerant to corruption is as follows.

First, the installation is staged. Next, the primary and back-up partition tables are both modified to install to add indication that an installation is in progress. In some examples, this indication is an "install in progress" entry in the primary partition table and the back-up partition table. The "install in progress" entry includes the range of data that is being modified during the install.

In some examples, after adding the install in progress entry to both tables, the backup partition table is written, so that the backup partition table includes entries for installation targets and/or the like. In some examples, next, the erasure code for the back-up partition table is regenerated, and a hash is generated for the back-up partition table. In some examples, next, the primary partition table is written, the erasure code for the primary partition table is regenerated, and a hash is generated for the primary partition table. Additionally, in some examples, a hash is generated for every block in the partition, and stored in a separate area of flash memory that tracks block hashes.

In some examples, if at any time the back-up partition is successfully written and not the primary partition table, as indicated by the primary and back-up partition tables not matching, if there is an install in progress entry, then all of the erasure coding blocks described by the install in progress entry within the range of data specified in the install in progress entry are regenerated, and then the erasure coding blocks for the partition tables are regenerated as well.

In some examples, next, as discussed above, if sufficient free space for the updated version does not exist, the steps discussed above may be performed. In some examples, after those steps, or skipping those steps is there is already sufficient free space in memory, the updated version is written to the partition. In some examples, next, the updated version is verified.

In some examples, after the updated version is verified, the erasure coding blocks are updated for the images. In some examples, the hashes are also updated. In some examples, next, the install in progress entry is removed from both partition tables.

In some examples, next, the current partition table is copied to memory. In some examples, the original version of the partition table is deleted from the copy, and the then the current version is added to the copy. In some examples, at this point, the copy is now the updated partition table. In some examples, the updated partition table is then written to the back-up partition table. In some examples, the erasure coding block for the back-up partition table is then updated. In some examples, the hash of the back-up partition table is then updated.

In some examples, the updated partition table is written to the primary partition table after the device next boots.

In some examples, next, a boot health check is performed, with the steps proceeds as in the previous example after the boot health check is performed. If both the primary partition table and the backup partition table are corrupt, some other repair methods such as erasure code repair may be used.

In some examples, the erasure coding block for the back-up partition table is then updated. In some examples, the hash of the back-up partition table is then updated.

As discussed above, in some examples, staging is performed prior to updating. In some examples, the staging is prioritized in multiple ways. The staging may be organized into priority groups that are ordered by priority, so that priority group with the highest priority is staged first in its entirety before proceeding to the next priority group, the next highest priority group is then staged in its entirety before proceeding to the next priority group, and so on, until each of the priority groups is staged.

In some examples, priority groups may include partitions, and may also include priority groups that are independent of partitions. The partitions may include some or all of the levels of trust in the defense-in-depth hierarchy, and the levels of priority of the priority groups may be in the same order as the trust order of the defense-in-depth hierarchy.

In some examples, the priority groups may include a trusted key store as a priority group with the highest level of priority, the bootloader as a priority group with the second level of priority, and the remaining priority groups as the partitions, with the priority of the partitions being in the same priority order as the trust in the corresponding levels of trust. For instance, in some examples, a priority group that is a partition corresponding to a layer of trust has priority over a priority group that is a partition corresponding to a layer of trust having less trust.

In some examples, priority groups may be based at least in part on dependencies. For instance, in some examples, a level of software may have a dependency on a more trusted layer of software. In some examples, the metadata describes such dependencies as "depends on" or "provides." That is, in some examples, a piece of software that is dependent on another piece of software is described that the piece of software "depends on" the other piece of software. Conversely, in some examples, the software that the piece of software "depends on" is described as software that "provides" for the piece of software that is depending on it. In some examples, "provides" layers are always updated before "depends" layers. In some examples, the priority layers ensure that this is true since a higher priority layer is staged before a lower priority layer.

In some examples, the priority groups and their priorities relative to each other are defined in a policy file. In some examples, the policy file may be updated dynamically, so that, for example, the priority of the priority groups relative to each other may be updated dynamically.

Each priority group may be staged as follows. The list that indicates the software that should be present once the update is complete is compared with the software currently present in the memory, for the priority group that is being staged. A list of absent install targets is generated based on the comparison, where the list includes software that not currently present in memory, or versions of software that need to be updated relative to the software currently in memory, in the priority group being staged. An absent target refers to a target that should be downloaded but has yet to be downloaded. For example, an absent install target is an install target that yet to be downloaded. After the target is downloaded, it is no longer absent.

Then, a list of purge targets may be generated based on the comparison, where the purge targets includes software currently present in memory but not present in the list of software that should be present once the updated is completed, for the current priority group. If the software to install is already present, then in some examples, the installer may preserve the existing installation by simply not generating an installation target or purge target.

The software corresponding to the install targets may then be acquired, such as by being downloaded. In some examples, the software acquired is not trusted until verified. Once a target is validated, in some examples, its signature is validated. If the signature is valid, then in some examples, a determination is made as to whether the target is an absent install target of the correct priority. If not, then in some examples, the target is discarded. If the target is an absent install target of the correct priority, then in some examples, the target changes its type from an absent install target to an installation target (because, by definition, the target is no longer absent).

In some examples, the software for the current priority group is then caused to be updated based on the installation targets. Also, the purge targets may be deleted. Once the installation is complete, in some examples, the installation targets are deleted from memory, because there may not be sufficient memory for the entire update to be staged on once.

Once installation of a priority group is complete, or once install targets are acquired a reboot may be required. For instance, in some examples, the update installation of some priority groups may require a reboot, and the update installation of other priority groups may not require a reboot. In these examples, responsive to the update installation of a priority group that requires reboot upon completion, the device is rebooted prior to the staging of the next priority group. In some examples, the acquisition of install targets may require a reboot for some priority groups, and the acquisition of install targets of other priority groups may not require a reboot.

The staging may be altered and may include additional steps in various examples, for example to include a rollback to the last known good state, for "absent rollback targets" of rollback targets, to allow for test applications, and/or for other reasons.

For instance, in some examples, the staging process may proceed as follows for a process that further includes a rollback to the last known good state. As part of staging a priority group, prior to determining absent install targets, absent rollback targets are determined for the priority group, such that there is an absent rollback target for each piece of software that is installed for the current priority group. After generating the absent rollback targets, the absent install targets may be generated. In some examples, the absent rollback targets for the priority group are downloaded in their entirety prior to downloading the absent install targets. This is an example of prioritization by entry type. Multiple levels of prioritization are performed in some examples. Absent rollback targets and absent install targets are two examples of entry types, where the absent rollback target entry type for a given priority group are prioritized over absent install target for the same priority group. In this way, the multiple levels of prioritization include prioritization by priority group and prioritization by entry type in some examples.

Like absent install targets, in some examples, for absent rollback targets that are downloaded, the software downloaded is not trusted until verified. The validation of the absent rollback target may include comparing the identity of the image to the expected identity in the absent rollback target. If the identity is not what is expected (i.e., the component id and image id do not match), the image is rejected. In some examples, once an absent rollback target is validated, its signature is validated. If the signature is valid, then in some examples, a determination is made as to whether the absent rollback target is an absent rollback target of the correct priority. In some examples, if not, the target is discarded. In some examples, if the target is an absent rollback target of the correct priority, the target changes its type from an absent rollback target to a rollback target (because, by definition, the target is no longer absent). Once all of the rollback targets of a particular priority group have been downloaded, in some examples, installation targets begin downloading or otherwise acquired in the manner described above. As discussed above, in some examples, the targets are compressed.

In some examples, as an exception to the normal process, if a particular current priority group has no changes, but priority groups before that current priority group have changes, then, for the current priority group, each of the rollback targets for the current group are converted to absent rollback targets temporarily. In this way, in these examples, these absent rollback targets are re-downloaded, and then converted to rollback targets again. This may avoid fragmentation. In this case, there are no installation targets, so no installation work is done.

The staging process may be further modified to accommodate test software in some examples.

For instance, in some examples, certain applications, such as test software, should be marked as temporarily applications. This may include, for example, test software that is loaded into a device in the factory and which is never updated over the cloud. Manufactures may mark such an application as temporary. If an application is marked as temporary, for an update being done, in some examples, temporary applications do not need rollback targets, and are instead simply purged. Accordingly, in some examples, during staging, an application that is marked as temporary has no rollback targets and is instead marked as a purge target.

If there is later a need to roll back to the previous known good state, in some examples, the rollback targets are converted to install targets, and the installation process then runs. In some examples, a cascading rollback is used based on dependencies. In a cascading rollback, if a particular layer is to be rolled back, a layer on which the current layer depends must be rolled back (because the rollback breaks a dependency), and then if that layer depends on another layer, that layer must be rolled back (because the rollback breaks a dependency), and so on.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5A:
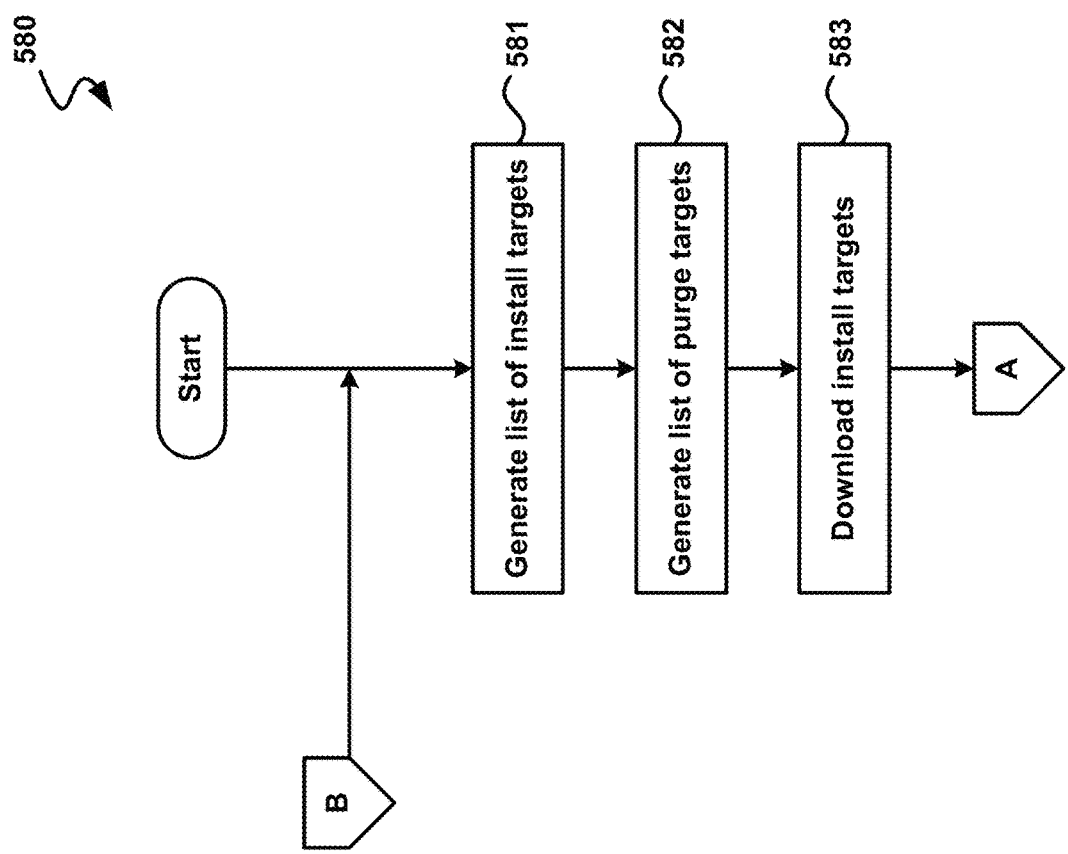
FIGS. 5A-5B are a flow diagram illustrating an example process in accordance with aspects of the present disclosure.
Figure 5B:
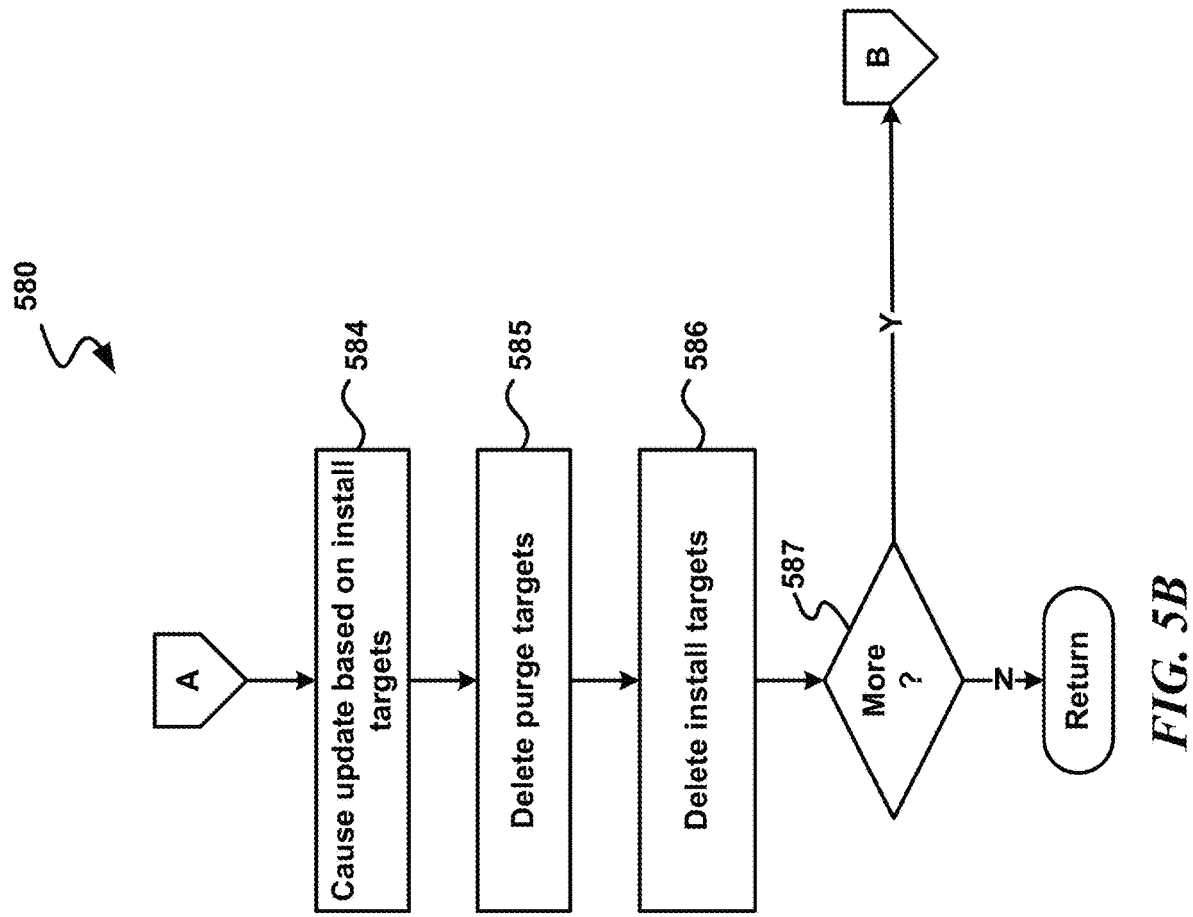

FIGS. 5A-5B illustrate an example dataflow for a process (580). In some examples, process 580 is performed by device controller, e.g., device controller 445 of FIG. 4. In other examples, process 580 may be performed in other suitable devices. In some examples, steps 581-586 encompassing staging of the current priority group, completing staging of each higher priority group before staging a lower priority group.

In the illustrated example, step 581 occurs first. At step 581, in some examples, a list of install targets is generated for the priority group based on a list of software for installation in a memory and software present in the memory. As shown, step 582 occurs next in some examples. At step 582, in some examples, a list of purge targets is generated for the priority group based on the list of software for installation in the memory and the software present in the memory. As shown, step 583 occurs next in some examples. At step 583, in some examples, the install targets are downloaded to a backup partition of the memory.

As shown, step 584 occurs next in some examples. At step 584, in some examples, updating of the software in the memory is caused based on the install targets. As shown, step 585 occurs next in some examples. At step 585, in some examples, the purge targets are deleted from the memory. As shown, step 586 occurs next in some examples. At step 586, in some examples, the install targets are deleted from the back-up partition. As shown, decision step 587 occurs next in some examples. In some examples, a decision step 587, a determination is made as to whether there are more priority groups to stage. If so, the process returns to step 581 for the next priority group. Otherwise, the process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A device, comprising:
 a memory and a processor, wherein the memory and the processor are respectively configured to store and execute instructions for causing the device to perform actions, the actions including:
  installing updated software for the device, the updated software for the device including at least updated software of a first priority group and updated software of a second priority group, wherein installing the updated software for the device includes:

staging an installation of the updated software of the first priority group, including:
    generating a list of install targets for the updated software of the first priority group;
    generating a list of purge targets for the updated software of the first priority group;
    downloading the install targets for the updated software of the first priority group to a partition of the memory, the partition of the memory being smaller than an entirety of the updated software for the device;
    installing the downloaded install targets for the updated software of the first priority group from the partition;
    deleting the purge targets for the updated software of the first priority group from the memory; and
    deleting the install targets for the updated software of the first priority group from the partition; and
after staging the installation of the updated software of the first priority group, staging an installation of the updated software of the second priority group, including:
    generating a list of install targets for the updated software of the second priority group;
    generating a list of purge targets for the updated software of the second priority group;
    downloading the install targets for the updated software of the second priority group to the partition;
    installing the downloaded install targets for the updated software of the second priority group from the partition;
    deleting the purge targets for the updated software of the second priority group from the memory; and
    deleting the install targets for the updated software of the second priority group from the partition.

2. The apparatus of claim 1, wherein the installing of the updated software for the device further includes:
after staging the installation of the updated software of the second priority group, staging an installation of updated software of a third priority group, including:
    generating a list of install targets for the updated software of the third priority group;
    generating a list of purge targets for the updated software of the third priority group;
    downloading the install targets for the updated software of the third priority group to the partition;
    installing the downloaded install targets for the updated software of the third priority group from the partition;
    deleting the purge targets for the updated software of the third priority group from the memory; and
    deleting the install targets for the updated software of the third priority group from the partition.

3. The apparatus of claim 1, wherein the first priority group and the second priority group are elements of a set of priority groups, and wherein the set of priority groups include a secure key store.

4. The apparatus of claim 1, wherein the first priority group and the second priority group are elements of a set of priority groups, and wherein the set of priority groups include a bootloader.

5. The apparatus of claim 1, wherein the memory is flash memory of an integrated circuit with multiple cores including at least one central processing unit and at least one microcontroller.

6. The apparatus of claim 1, wherein the staging of the installation of the updated software of the first priority group further includes:
generating a list of rollback targets for the updated software of the first priority group.

7. The apparatus of claim 6, wherein the installing of the updated software for the device further includes:
rolling back to a last known good version of the software of the first priority group, including changing the rollback targets for the updated software of the first priority group to install targets for the updated software of the first priority group.

8. The apparatus of claim 6, wherein the staging of the installation of the updated software of the first priority group further includes:
for software in the memory marked as temporary, marking the temporary software as a purge target.

9. The apparatus of claim 1, wherein the first priority group and the second priority group are elements of a set of priority groups, and wherein the set of priority groups include a set of partitions.

10. The apparatus of claim 9, wherein the set of partitions correspond to a set of independent execution environments configured to have a defense-in-depth hierarchy.

11. The apparatus of claim 10, wherein at least two independent execution environments in the set of independent execution environments are running on general purpose cores with differing capabilities from each other, and wherein the general purpose cores with differing capabilities from each other include at least a first microcontroller and a first central processing unit (CPU).

12. A method, comprising:
installing updated software for a computing device, the updated software for the computing device including at least updated software of a first priority group and updated software of a second priority group, wherein installing the updated software for the computing device includes:
staging an installation of the updated software of the first priority group, including:
    providing a list of install targets for the updated software of the first priority group;
    providing a list of purge targets for the updated software of the first priority group;
    downloading the install targets for the updated software of the first priority group to a partition of a memory of the computing device, the partition of the memory being smaller than an entirety of the updated software for the computing device;
    deleting the purge targets for the updated software of the first priority group from the memory; and
    deleting the install targets for the updated software of the first priority group from the partition responsive to an updating of the software of the first priority group; and
after staging the installation of the updated software of the first priority group, staging an installation of the updated software of the second priority group, including:
    providing a list of install targets for the updated software of the second priority group;
    providing a list of purge targets for the updated software of the second priority group;
    downloading the install targets for the updated software of the second priority group to the partition;
    deleting the purge targets for the updated software of the second priority group from the memory; and deleting the install targets for the updated software of the second priority group from the partition responsive to an updating of the software of the second priority group.

13. The method of claim 12, wherein the installing of the updated software for the computing device further comprises:
after staging the installation of the updated software of the second priority group, staging an installation of updated software of a third priority group, including:
providing a list of install targets for the updated software of the third priority group;
providing a list of purge targets for the updated software of the third priority group;
downloading the install targets for the updated software of the third priority group to the partition;
deleting the purge targets for the updated software of the third priority group from the memory; and
deleting the install targets for the updated software of the third priority group from the partition responsive to an updating of the software of the third priority group.

14. The method of claim 12, wherein the first priority group and the second priority group are elements of a set of priority groups, wherein the set of priority groups include a set of partitions.

15. The method of claim 12, wherein the staging of the installation of the updated software of the first priority group further includes:
providing a list of rollback targets for the updated software of the first priority group.

16. The method of claim 15, wherein the installing of the updated software for the computing device further comprises:
rolling back to a last known good version of the software of the first priority group, including changing the rollback targets for the updated software of the first priority group to install targets for the updated software of the first priority group.

17. A processor-readable storage medium, having stored thereon processor-executable code that, upon execution on a computing device, causes the computing device to perform actions, the actions comprising:
installing updated software for the computing device, the updated software for the computing device including updated software for each of a plurality of priority groups, and wherein the installing of the updated software for the computing device includes:
staging installations of the updated software for each of the plurality of priority groups, including completing a staging of the installation of the updated software for a higher priority group before beginning a staging of the installation of the updated software for a lower priority group, the staging of the installation of the updated software for each priority group including:
generating a list of install targets for the updated software of that priority group;
generating a list of purge targets for the updated software of that priority group;
downloading the install targets for the updated software of that priority group to a partition of a memory of the computing device;
installing the downloaded install targets for the updated software of that priority group;
deleting the purge targets for the updated software of that priority group from the memory; and
deleting the install targets for the updated software of that priority group from the partition; and
updating a partition table of the memory to reflect completion of the installation of the updated software for the computing device.

18. The processor-readable storage medium of claim 17, wherein each of the priority groups are elements of a set of priority groups, wherein the set of priority groups include a set of partitions.

19. The processor-readable storage medium of claim 17, wherein the staging of the installation of the updated software of each priority group further includes:
generating a list of rollback targets for the updated software of that priority group.

20. The processor-readable storage medium of claim 19, wherein the installing of the updated software for the computing device further comprises:
rolling back to a last known good version of the software for a first priority group of the priority groups, including changing the rollback targets for the software for the first priority group to install targets for the software for the first priority group.

* * * * *